United States Patent [19]

Brudermann

[11] Patent Number: 5,419,793
[45] Date of Patent: May 30, 1995

[54] METHOD FOR FORMING CLOSURE ELEMENTS WITH MUSHROOM-SHAPED CROSS SECTIONS ON A HEAT-SHRINKABLE PLASTIC WEB

[75] Inventor: Uwe Brudermann, Hagen, Germany

[73] Assignee: RXS Schrumpftechnik-Garnituren GmbH, Hagen, Germany

[21] Appl. No.: 20,389

[22] Filed: Feb. 22, 1993

[30] Foreign Application Priority Data

Feb. 28, 1992 [DE] Germany .................. 42 06 293.4

[51] Int. Cl.⁶ ................. B32B 7/04; B32B 31/00; B29C 67/00
[52] U.S. Cl. .................... 156/66; 156/91; 156/202; 156/269; 156/321
[58] Field of Search ............ 156/66, 91, 202, 269, 156/321, 362, 363, 461, 468, 477.1, 496; 138/99, 158, 167

[56] References Cited

U.S. PATENT DOCUMENTS

| | | | |
|---|---|---|---|
| 3,066,063 | 11/1962 | Ecklund et al. | 156/461 |
| 3,192,088 | 6/1965 | Lariviere | 156/202 |
| 4,379,473 | 4/1983 | Kunze . | |
| 4,606,784 | 8/1986 | Glans et al. | 156/461 |
| 4,684,419 | 7/1987 | Agosta | 156/202 |
| 5,043,036 | 8/1991 | Swenson | 156/496 |

FOREIGN PATENT DOCUMENTS

| | | |
|---|---|---|
| 0063868 | 11/1982 | European Pat. Off. . |
| 225152 | 6/1987 | European Pat. Off. . |
| 0270132 | 6/1988 | European Pat. Off. . |
| 0272364 | 6/1988 | European Pat. Off. . |
| 92981 | 1/1969 | France . |
| 2595339 | 9/1987 | France . |
| 2853518 | 10/1979 | Germany . |
| 3009078 | 1/1983 | Germany . |
| 234998 | 6/1925 | United Kingdom . |

Primary Examiner—Michael W. Ball
Assistant Examiner—Richard Crispino
Attorney, Agent, or Firm—Hill, Steadman & Simpson

[57] ABSTRACT

A method and apparatus for wrapping edges of a web around rod inserts to form closure elements or profiles on the web.

7 Claims, 4 Drawing Sheets

METHOD FOR FORMING CLOSURE ELEMENTS WITH MUSHROOM-SHAPED CROSS SECTIONS ON A HEAT-SHRINKABLE PLASTIC WEB

BACKGROUND OF THE INVENTION

The present invention is directed to a method for applying or forming profiles having a mushroom-shaped cross section as closure elements along two longitudinal edges of a plastic web that is heat-shrinkable transversely relative to the longitudinal direction.

The fastening of a soft, planar material can occur in a known way according to the method of a "garter belt". In this arrangement, a hard substrate is applied to one side of the material, wherein a soft, planar material is deformed so that it surrounds the hard substrate to such an extent that it cannot be removed in the motion direction mechanically stressing the soft, planar material without having the soft, planar material either distorted or destroyed. The removal is thereby prevented in that a comparatively non-deformable member having a concave inside contour is placed over the thickening produced and the contour of the soft, planar material by the substrate, so that the thickening has an undercut in a roughly mushroom shape that makes a removal of the thickening from the outer, concavely-shaped member impossible without destruction. In a garter belt, the inner, hard member is connected button-like to the outer, hard member with a band which is flexible, but captive fashion, whereas the outer, hard member comprises a known pear-shaped opening and is usually formed of a bent wire. The broader part of the opening, thus, allows the insertion of the button together with the hose material placed thereover to pass through, whereas the narrower part of the opening, in fact, surrounds the planar material shaped around the button-shaped member, but does not allow the button with its cladding of hose material to pass. Such a two-dimensional example only allows the closure to be opened in the opposite direction on the line-shaped assembly path and prevents disassembly in all other directions of motion.

When such a closure having a profile-shaped, inner member is executed in this way, then the closure means for shrink collars, particularly for reinforced shrink collars, can be manufactured so that they constitute a one-dimensional example of this principle. In such shrink collars, the principle that has been set forth is applied in such a fashion that a rod-shaped element is arranged along the longitudinal edges of the shrinkable web composed of plastic. After each longitudinal edge has been folded around the rod-shaped insert to form what is referred to as a mushroom head, the two longitudinal edges, which have been provided with the rod-shaped inserts, are then pressed against one another. What is referred to as a "mushroom head" here is the fact that the edges comprise a profile having a mushroom cross section. A C-shaped rail is then drawn on over these mushroom heads. In the manufacturing process, the edge of the collar material is placed to extend along the rod-shaped, hard member so that the flexible flat material in the region of the closure will have twice the thickness of the edge region occurring, and this comprises a thickened edge whose core is non-resilient. When the rail is then thrust over the thickening, this can no longer be a non-destructively released transversely relative to the push-on direction from the closure element having a mushroom-shaped section.

European Published Patent Application 0 272 364 discloses a method in accordance wherein an enclosure rod insert can occur. It may be derived therefrom that the enclosure of the rod insert is undertaken in a discontinuous process, for example only over a length corresponding to the collar. A longitudinal edge of the collar is respectively bent over loop-shaped therein, and is clamped in a clamp device in collar length and the rod is introduced into the loop contour. Subsequently, the loop is reshrunk onto the introduced rod by heating. A disadvantage of this is that the collar material provided with a shrinkable fabric must be heated to shrink temperature for reshaping in the edge regions in order to thereby make it soft and elastic. As a result of the shrinking, the material becomes thicker and the amount by which it becomes thicker depends on the loop geometry, which is not easy to reproduce, as well as on the initial thickness of the material that is, likewise, dependent on the local stretch factor, which is also not easy to reproduce, and also on the strength of the material before stretching. The geometry of the edge after shrinking has been finished is, thus, critically dependent on the shrink properties of the material. The shrink process itself is dependent on the material deformation that is dependent on the factors cited here, for example deformation produced by unknown forces and tensions, and it follows therefrom that the edge contour or edge geometry cannot be exactly predetermined. The edge geometry can only be tolerated to a limited degree for the application of the C-rail. After the softening of the matrix, moreover, the threads of the fabric insert that essentially effect the shrinking forces can easily pull out from the edge region, due to the longitudinal shrink inherent in them, or can change their position within the matrix. In addition, in this type of edge treatment, a part of the shrink dimension is used and is, thus, no longer available for the actual function of the collar. As a result of the shrinking process in the loop region, the loop region is thickened without the hard rod insert likewise correspondingly increasing in thickness, as a result whereof the difference between the expanse of the thickened region having the mushroom-shaped cross section and the part having the cross section shaped like a mushroom stem have twice the thickness of the collar material which is situated in the clamp mechanism during production, and this difference is usable for the closure of the collar and requires a less beneficial shaping of the C-rail.

U.S. Pat. No. 4,379,473, whose disclosure is incorporated herein by reference thereto and which claims priority from German Application 30 09 078, also discloses a longitudinally divided cable sleeve of shrinkable material having embedded reinforcing means and beads along the closure regions. These longitudinal beads provided with rod inserts are individually introduced therein into the longitudinally proceeding channels of the T-shaped closure rail and are held together.

A method for manufacturing sheet metal profiles from bands of material are also generally known from the sheet metal industry, wherein the profiling is undertaken step-by-step utilizing roller sets in a continuous process on the basis of the stations arranged following one another. Such a method, however, cannot be employed for the plastic material of which the shrink collars are manufactured, particularly when a collar material having the reinforcing insert is involved, because these collar materials do not have the plasticity of the sheet metals employed for the profile manufacture and the deformation is, therefore, undone to a certain extent following each stage. Moreover, the low internal strength of the collar material also simultaneously causes a proportion of longitudinal dilatation in the intentional deformation at the roller sets of the shaping device, and this longitudinal dilatation noticeably deteriorates the planarity of the collar and its applicability and making a comfortable slip-on of the C-rail impossible. The longitudinal dilatation also necessarily effects a lateral excursion of the web edges from the sets of rollers of the shaping means in the continuous deformation process.

SUMMARY OF THE INVENTION

The object of the present invention is based on a first object of finding a method with which rod inserts can be arranged simply and economically along the longitudinal edges of a web-shaped, shrinkable collar material so that the longitudinal edges formed in this way form a common closure element after enclosing an article and over which a C-shaped closure rail can be drawn. In the method of the above-mentioned types, the stated object is then achieved in that both longitudinal edges of the plastic web are continuously and simultaneously re-shaped mirror-symmetrically relative to one another by at least three pairs of roller sets to form closure elements, whereby at least one roller set pair has a toe-in mounted on a carriage rotatable around a vertical axis and that the plastic web is transversely stressed during delivery and in that the angular position of the carriage is variable on the basis of a sensing means situated at a longitudinal edge of the plastic material, so that the lateral migration of the plastic web is prevented. The method includes that each of the longitudinal edges of the plastic webs is shaped into channels in a second roller set pair and that the rod inserts are simultaneously or subsequently introduced into the channel thus formed, whereby the rod inserts are heated before introduction so that the adhesive of the adhesive-coated plastic web is activated upon contact with the rod inserts and are fixed when the adhesive cools. The method also includes that, subsequently, each of the longitudinal edges already reshaped to this extent have their adhesive-coated side heated until the adhesive coatings are activated and that such longitudinal edges are shaped around the respectively fixed rod insert by a further or third roller set pair, so as to glue, with pressure and with calibration to form a planar side and with an undercut profile side, and, finally, that the continuously produced plastic web is cut to lengths into individual pieces having the desired size in a cutting apparatus.

There is also the object to create an apparatus in which the method of the invention can be utilized. This object is achieved with an apparatus which includes haul-off means for a plastic web being arranged at the beginning of the apparatus, a first roller set pair being provided for Z-shaped forming of the longitudinal edges of the plastic web, that the rotational axis of the first roller pairs are directed toward the middle of the processing web at a toe-in angle and the first pairs are mounted on a rotatable carriage, which carriage is controllable by a sensing means and adjustment means, a second pair of rollers for shaping the already-formed longitudinal edge of the plastic webs into a channel for receiving a rod insert and includes heating devices being arranged at the entry locations for the rod insert and at a gluing location of a next following pair of the system, wherein the next following pair have a calibration means with shaping rollers arranged to shape the web adjacent the rod and, finally, the device includes cutting means at the end of the processing path.

The method of the invention can no longer have the afore-mentioned disadvantages; however, there are also critical advantages compared to the cited prior art. Among other things, thus, a considerably simpler and more cost-beneficial manufacture occurs, since a continuous and, thus, uniform edge application for closure elements at both sides of the longitudinal edges of a heat-shrinkable web can occur. The edge disturbances due to the migration of the web material that usually occurs can be avoided as a result of the execution of the shaping device. Moreover, any desired and calibratable shaping can occur on the basis of a simple conversion of the shaping device, so that different collar types can be manufactured on the same shaping device, wherein the simultaneously reshaping of both edges can also simultaneously occur. No heating and cooling of the collar material, moreover, is required in the application of the closure element, so that the reshaping of the longitudinal edges can occur without activating shrink forces and, thus, without damage to the material. In addition, possibilities for displacing adhesive in the fold region occur at the shaping device. A high process reliability can be achieved on the basis of an automatic fold control, whereby great savings with respect to operation of the shaping device occurs as a result of the high degree of automation. Moreover, one can proceed on the basis of different initial width, so that only one device is needed for various collar types.

The method of the invention does not have the disadvantage to be found in the prior art, and the following advantages, therefore, occur:

For symmetrizing, both collar edges to be shaped are simultaneously shaped in that every roller set is doubly mirror-symmetrically present and both edges are simultaneously reshaped. In order to achieve the stretching of the plastic web transversely relative to the processing direction, it is at least necessary, in order to hold the profiled edges in a defined and constant spacing over the web length, that roller set pair between which a sag is possible is lent a toe-in on the basis of a suitable angular placement of the roller axles, i.e., transverse forces are exerted onto the web of the collar material by the roll-off mechanism of the rollers of the particular roller stations, so that the left-hand web edge is pulled toward the left and the right-hand web edge is pulled toward the right. These transverse forces cannot always be kept symmetrical given fixed settings of the roller sets, so that the force acting toward the left or toward the right can predominate and this will cause an override of the plastic web at the one side connected with a run-out of the plastic web at the opposite side. This is inventively prevented by the web edge control as set forth below. The roller sets that have the described risk are mounted on a carriage that is seated around a pivot point extending perpendicular to the web surface so that a migration of the web vis-a-vis this carriage varies the setting or, respectively, toe-in angle of the roller set pairs attached to the carriage to effect an opposite direction so that a lateral deviation of the web position relative to the carriage is self-correcting.

The function of the web edge control can also be enhanced by a servo means.

A material is employed for the rod insert that is, in fact, hard enough so that it cannot be squashed in the intended employment, but is adequately flexible in order to be processed by the rollers. Polyamide rod, fiberglass-spun fiberglass bundles or wire inserts, are examples of such materials.

In order to pre-fix the rod insert at its intended location in the folding process, it is heated before placement onto the adhesive side of the plastic web upon passage through a suitable thermal chamber or hot-air jet to such an extent that it activates the adhesive layer when placed against the plastic web and is rolled onto the cold plastic web in the following roller unit, whereby the adhesive immediately solidifies without impermissible softening of the web edges. The temperature and the flow rate of the hot air are, thus, selected so that the adhesive coat is activated but the plastic web is kept below the shrink temperature.

The adhesive layer is designationally heated via regulated hot air streams at the roller stations at which the web edge regions having the adhesive coated sided are placed on top on one another, and the web surfaces residing opposite one another are glued to one another in the following roller set. Thus, the thickness of this region, which is the cross section of the mushroom stem, as well as the contour around the rod insert, which is the cross section of the mushroom head, are simultaneously calibrated.

In order to guarantee the proper conveying of the plastic web through the station, reshaping stations, pairs of roller sets, always alternate with conveying stations, which are roller pairs, that are respectively driven. Diameters and the speeds of the conveying rollers are thereby matched so that the conveying speed in the idle direction, without the plastic web, increases from station to station in the conveying or processing direction. A stretching of the plastic web in the longitudinal direction is, thus, obtained. In order, however, to prevent damage to the web surface, as well as to prevent an inadmissible longitudinal elongation of the plastic web, the conveyor rollers work via suitable friction clutches with which the longitudinal tension on the web can be set.

The roller sets are secured so that the spacing from the respective other partner of each and every pair of roller sets can be varied and set in order to process plastic webs having a different width.

The form rollers, for example, can be composed of a roller set of coaxially seated individual rollers that, however, are rotated relative to one another.

Conveying rollers of different widths are needed for the collars having different widths. So that a separate conveying roller or, respectively, set of conveying rollers need not be produced for every collar width, the conveying rollers can have their working width varied in such a way that the conveying rollers are composed of discs having the same or different thicknesses but the same diameter which are slipped onto the shaft, whose length corresponds to the maximum processing width and are fixed thereat, namely in a plurality that corresponds to the currently demanded working width of the conveying rollers. The working width of the conveying rollers can thereby be varied in steps by adding or removing discs having the respectively same diameter than can be connected to the roller shaft in an anti-slip fashion.

The apparatus defining the method of the present invention can be easily supplemented by additional component parts of the production line that are known per se. These include take-off means for the web material, edge cutters, alignment units and introduction aids for the approach, welding devices for low-board attachment, printing systems, transverse separating means, and packaging means.

Other advantages and features of the method, the shaping device, as well as the device being produced will be readily apparent from the following description of the preferred embodiments, the drawings and claims.

DESCRIPTION OF THE PREFERRED EMBODIMENTS

Figure 8:
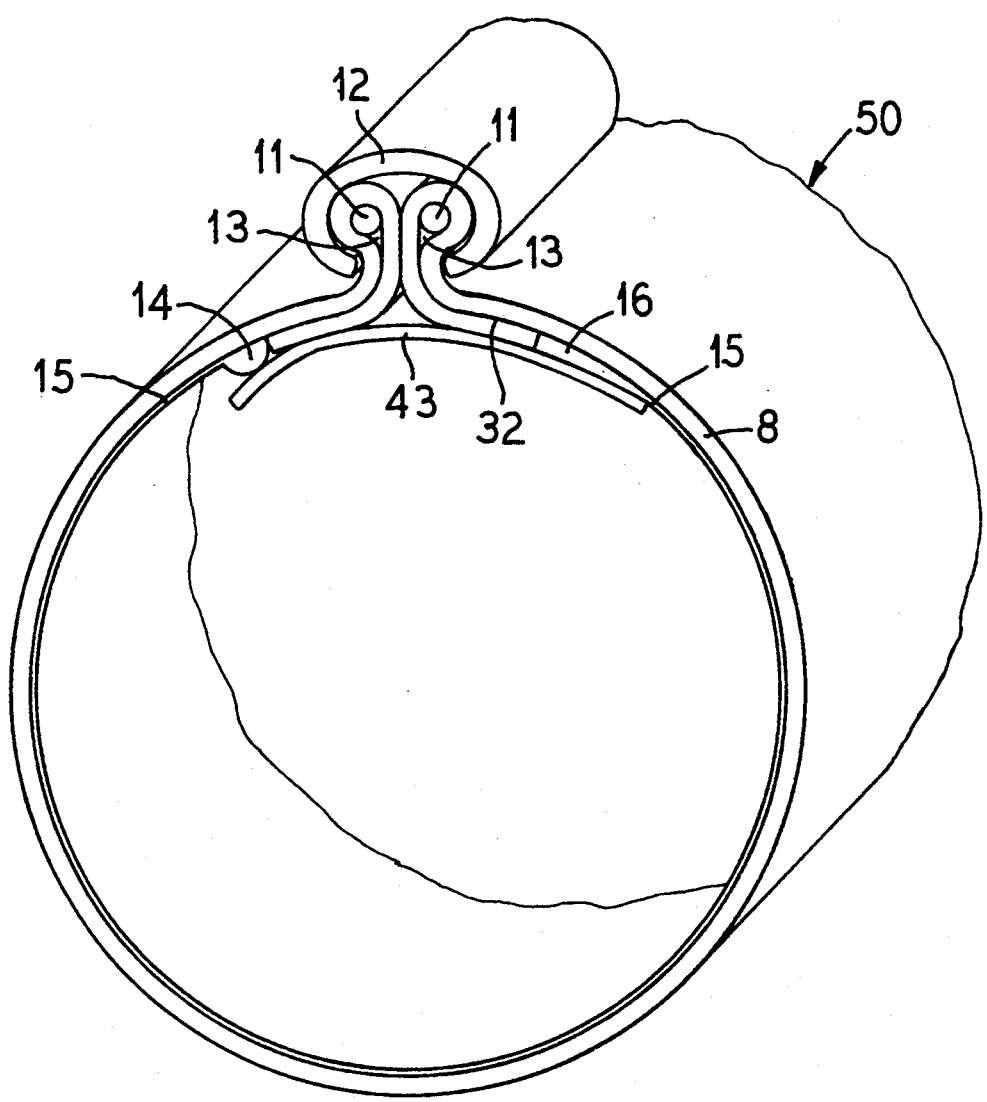
FIG. 8 is a perspective end view of a shrinkable collar manufactured according to the method and apparatus of the present invention, wherein an underflap has been applied.

The principles of the present invention are particularly useful for forming a shrinkable collar, generally indicated at 50 in FIG. 8.

Figure 1:
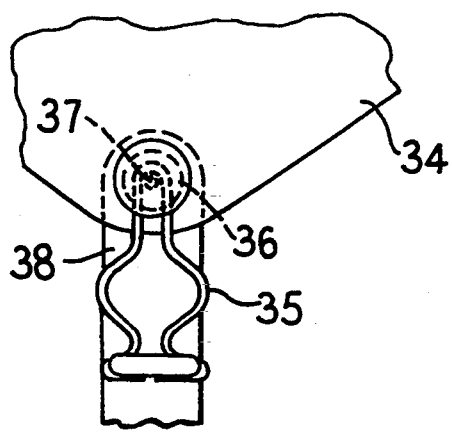
FIG. 1 shows the principle of a single closure having a mushroom form, which is standard in well-known garter belts.
Figure 2:
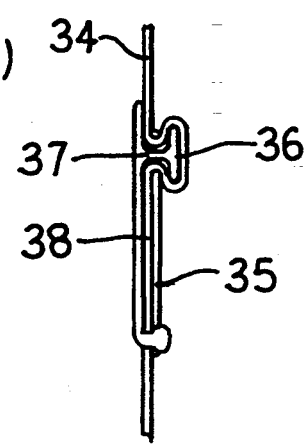
FIG. 2 is a cross sectional view of the element of FIG. 1.
Figure 3:
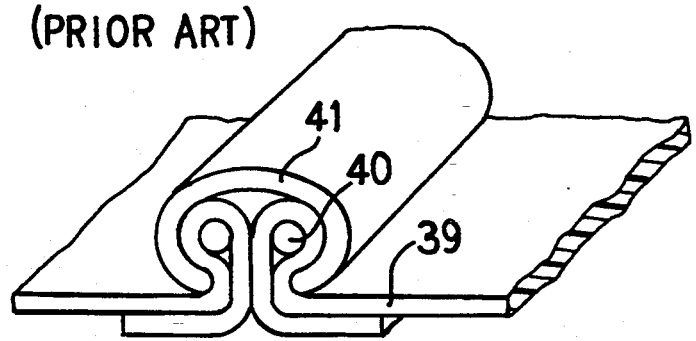
FIG. 3 is a perspective view illustrating a closure principle with shrinkable collars having folded-over longitudinal edges which receive rod inserts.

FIGS. 1, 2 and 3 illustrate prior art which was discussed hereinabove. In FIGS. 1 and 2, the principles of a garter belt are illustrated. The garter belt has a flat part or sheet 34 which is to be secured to a band 38 with the assistance of a mushroom-shaped clamp element having a head 36 and a stem 37. The band 38 supports the mushroom-shaped clamp element 36, 37 at a free end. A section of the flat part 34 is now shaped over the mushroom head 36, wherein a clamping occurs behind the mushroom head 36 in a constriction of a region of the stem 37 with the assistance of a clamp loop 35. The clamp loop 35 is captively connected to the band 38 in a fashion so that it can be initially guided over the mushroom head 36 covered with the portion of the flat part or material 34. After this has been inserted over the head, the loop 35 is pulled down so that the constricted part of the loop now clamps in an anti-slip fashion in the region of the stem 37. The flat part 34 is, thus, co-clamped between the mushroom head and stem 36 and the wire forming the loop 35.

As shown in FIG. 3, a closure for a cable sleeve, such as illustrated and disclosed in the above-mentioned European Published Application 0 272 364 is illustrated. As illustrated, the longitudinal edges 39 of a collar are bent around rod inserts 40 in a discontinuous process and are subsequently shrunk onto these introduced rod inserts 40 by heating. What is a disadvantage here is that the discontinuous production and the heating of the edge regions when fixing the rod inserts causes a shrinking. Finally, a C-rail, which has a C-cross section, is inserted to grip the two edges, as illustrated.

Figure 4:
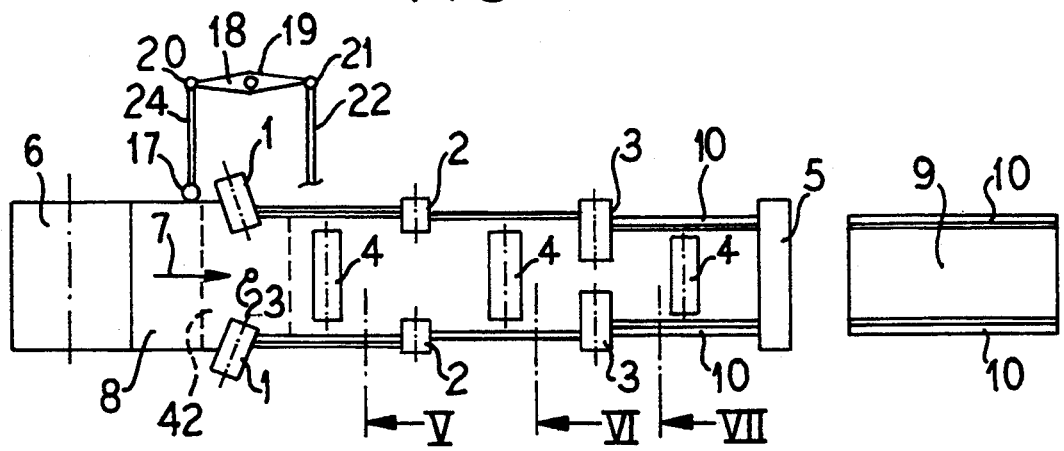
FIG. 4 is a schematic plan view of an arrangement of individual manufacturing stages for performing the method of the present invention.

As illustrated in FIG. 4, a method and apparatus wherein a plastic web 8 already shrinkable transversely relative to the processing direction 7 can be provided with closure elements 10 along both longitudinal edges in a continuous way, wherein the nonshrinkable rod inserts 11 are co-formed into these closure elements 10 at both sides of the shrinkable plastic web 8. The shrinkable plastic web 8 is introduced into the system of the invention from a haul-off unit 6 and is conveyed by conveying means in the processing direction 7 for profile application along the longitudinal edges and successively transverses rollers pairs 1, 2 and 3 with constant processing speeds that are positioned at the longitudinal edges of the heat-shrinkable plastic web. The profile application occurs step-by-step with these roller set pairs 1, 2 and 3 and the conveying of the plastic web 8 is thereby undertaken by the conveyor roller pairs 4 of the conveying means. The roller pairs 4 are driven by a common drive by appropriate design of the transmission elements and friction clutches intervening per roller pair or are alternately driven via separate control drives so that their circumferential speed in a no-load operation increases as seen from left-to-right in the system, so that the operating speed of all conveying roller pairs 4 given an introduced plastic web is, in fact, necessarily the same, but the conveying force exerted by them on the plastic web increases in steps from left-to-right and exerts a tensile stress in the conveying direction 7 onto the plastic web 8, which is adequate for tensioning or making the web taut.

In the illustrated exemplary embodiment, the rotational axes of the roller set pair 1 are not aligned perpendicular to the processing direction, but are respectively turned toward the middle of the web by a toe-in angle between 0° and 90°, and preferably in a range of 0.5° to 5°. The plastic web 8 is, thus, stretched transversely relative to the processing direction 7. At the same time, the roller set pairs are mounted on a carriage, which is indicated in broken-line form, which carriage is rotatable by a pivot connection around an imaginary axis 23, which extends perpendicular to the plane of the drawing. The relative position of the carriage 42 vis-a-vis the plastic web 8 is defined by a steering linkage 22, which is connected to the carriage 42 in an articulate fashion, on the one hand, and effects a steering motion of the carriage 42, on the other hand. The linkage 22 is actuated via a pivotable connection 21 by a rocker arm 18, which turns or moves around a shaft 19, and the rocker arm 18 is connected by a pivotable connection 20 to a rod 24 that senses the position of the edge of the plastic web by a sensing roller 17.

This web edge control then acts in the following manner. When the plastic web 8 migrates or moves toward the left, as seen in the processing direction 7, then the rod 24 also moves toward the left, and the steering linkage 22 will then move toward the right and rotate the carriage 24 and the roller set pair 1 mounted thereon toward the right. The toe-in angle of the roller set 1 on the left side of the plastic web is diminished, while, in contrast, the toe-in angle on the opposite side is enlarged. The result of this movement is a change in the transverse force acting to tighten the plastic web 8 transversely relative to the processing direction 7, due to the toe-in decrease on the left and the increase on the right side. The resulting force of the roller set pair 1 will shift the web toward the right and cause the lateral deviation of the plastic web edge to disappear. Given the deviation of the plastic web 8 toward the right, the procedure occurs in the opposite manner. One is, thus, in a position to dimension the plastic web edge control so that a straight-line conveying of the plastic web 8 will be guaranteed.

This rocker arm mechanism 18, 19, 20 and 21 can also be replaced by a correspondingly acting servo control unit, which would cause rotation of the carriage in response to measurements showing the shifting of the position of the left edge.

As illustrated in FIG. 4, a cutting means 5 can be provided at the end of the device or apparatus for continuously forming the closure profiles 10 along the longitudinal edges of the plastic web. Thus, it is possible to cut the continuously manufactured plastic web in a direction transverse to the processing direction 7 to any desired length. Therefore, collar types 9 of different lengths having lateral closure profiles or elements 10 can be obtained in this manner.

Figure 5:
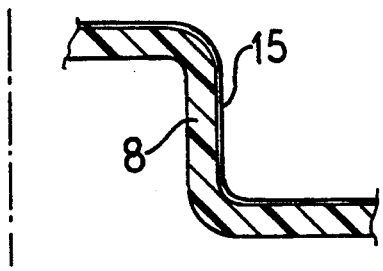
FIG. 5 is a cross sectional view of a portion of the web taken along the line V of FIG. 4 after the web has been acted on by the first roller set.

As already indicated, the shaping along the plastic web 8 occurs in steps in a plurality of stages following one another and is undertaken with the assistance of roller set pairs 1, 2 and 3. In the roller set pair 1, thus, the longitudinal edges of the plastic web 8, which is preferably already coated with an adhesive 15, is pre-shaped to such an extent that the rod insert 11 can be introduced. This pre-shaping preferably has a Z-shaped cross section on both longitudinal edges, as shown in FIG. 5. The roller set 1 that can be utilized for this purpose have profiles appropriate for the purpose, wherein every roller set can be constructed of a pair of rollers or of a plurality of pairs of rollers per longitudinal edge.

Figure 6:
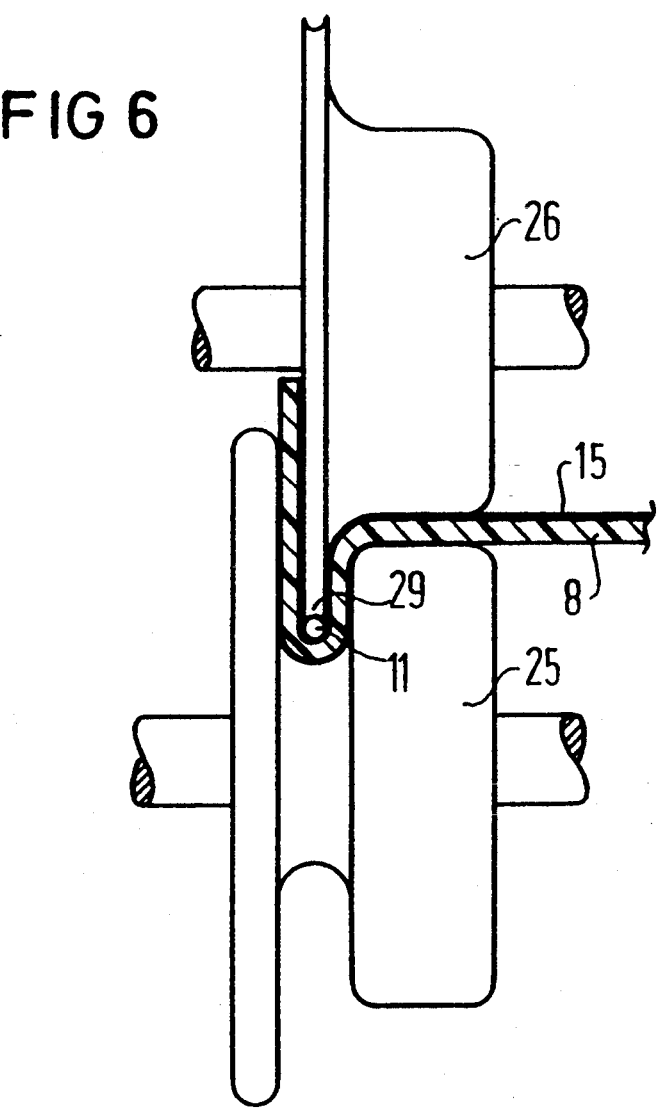
FIG. 6 is a cross sectional view taken along the line VI showing a second roller set acting on the web.

In the roller set 2, which is composed of the shaping rollers 25 and 26, the free leg of the entering plastic web 8, which already has a Z-shaped profile as shown in FIG. 5, is folded up, as shown in FIG. 6, to form a channel 29. Simultaneously, a rod insert 11 is tangentially introduced into the channel 29 by the roller 26. The rod insert 11 proceeds through a thermal chamber before entry into the roller set 2 and is, thus, heated to such an extent that upon contact with the adhesive layer 15 situated on the plastic web 8, the rod activates the adhesive in the channel 29 and consequently adheres to the plastic web 8. Since the thermal content of the rod insert 11 is selected so slight that the adhesive cools again after the gluing while in the roller 2 and is, thus, solidified, the rod is fixed in the channel.

Folding the free leg of the longitudinal edge up, however, can already occur in the roller set 1. Only the positioning and the gluing of the rod insert 11 are, thus, undertaken in the roller set 2.

Figure 7:
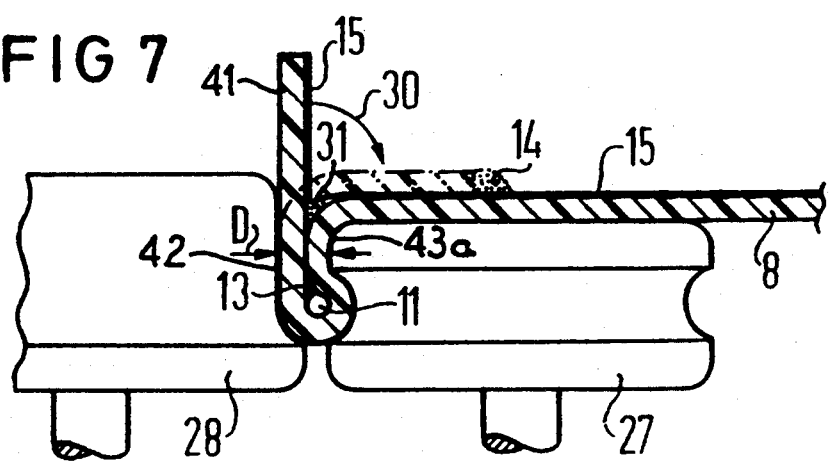
FIG. 7 is a cross sectional line taken along the line VII of FIG. 4 showing the action of the third set of rollers on the web.

As illustrated in FIG. 7, the roller set 3 is composed of shaping rollers 27 and 28. The channel 29 of FIG. 6 is heated here, for example, by a hot air stream, before entry into the roller set 3, and is heated to such an extent that the adhesive 15 in the channel is activated. Subsequently, the plastic web 8 is shaped as illustrated in FIG. 7 and, due to the position of the shaping rollers 27 and 28, the dimension D recited therein is reduced to twice the thickness of the material. The adhesive thereby collects in the regions 13 and 31. Here, too, the material again cools quickly so that the profile shape that is provided solidifies in a calibrated fashion in the contour defined by the geometry of the roller set. Thus, the closure element will have a planar side 42 and an undercut profile 43a.

Folding the leg 41 that is still free over in the direction of arrow 30 into the form shown with broken lines expediently occurs in a further of four roller pair, which is not illustrated, and which follows the roller set 3. This additional pair is heated and folds over the leg 15, and presses and fixes the leg on the adhesive side therein in the same way. The adhesive 14 thereby, likewise, emerges at the end of this folded-over leg 41.

The assembled collar 50 is illustrated in FIG. 8 in a completely assembled manner. It is shown in the illustrated form that the closure element applied to the longitudinal edges, which have the sides 42 brought against one another with the inserts, longitudinally proceeding rod inserts 11, and are held together with a longitudinal rail 12. The so-called underflap 43 may also be seen in the inside of the collar, the junction of the closure elements being bridged at the long side with this underflap 43. For example, this underflap 43 can be rolled on as a band. This expediently occurs so that the adhesive-coated side thereof is heated for activating the adhesive, as a result whereof the quantity of adhesive 14 that emerged during the manufacturing process is also softened. This leads to the fact that the quantity of the adhesive 14 on the side of the underflap is squeezed into the shape of the adhesive referenced 16 on the right side. Additionally, the underflap 43 is glued to the longitudinal edge in the region 32.

One advantage of the device of the present invention is also comprised in that the diameter of the collars can be determined on the basis of the pre-selected band width. Moreover, the collar length can be determined in all of these instances by selecting the corresponding intervals in the actuation of the cutting means 5. The plastic web 8 is composed of one of the standard shrink compounds, preferably a polyolefine. It can also be composed of known fiber-reinforced materials, for example in the form of a plastic matrix with an introduced reinforcing insert of fibers, threads or of planar inserts. The plastic web 8 can also be coated with an aluminum foil for reducing vapor permeation. The plastic web 8 is preferably already coated with a standard hot-melt adhesive, for example a polyamide hot-melt adhesive whose activation temperature lies below the shrink temperature for the material.

A respective plurality of the shaping rollers that appropriately supplement one another in terms of their profiles can be arranged within a roller set. However, a straight-line profile can also be provided against which an individual, corresponding shaping roller works. The spacing between the individual shaping rollers or, respectively, the shaping roller and the straight-line profile, are set in accordance with the thickness of the plastic web. The rod inserts are supplied to both sides of the plastic web from corresponding storage containers and, as already cited, are composed of a nonshrinkable material.

The appropriate calibration of the closure elements is also undertaken in the last shaping stage, namely that they are lent a planar surface on their sealing side, whereas they have an undercut profile on the back side into which the closure rail to be drawn on is respectively introduced.

The cutting means provided at the end of the processing device is preferably executed as a punch, and is driven at appropriate intervals.

Although various minor modifications may be suggested by those versed in the art, it should be understood that I wish to embody within the scope of the patent granted hereon all such modifications as reasonably and properly come within the scope of my contribution to the art.

I claim:

1. A method for forming closure elements along two longitudinal edges of a plastic web, said plastic web being heat-shrinkable transversely relative to a longitudinal direction and the closure elements when pressed against one another having a mushroom-shaped cross section, said method comprising the steps of conveying the plastic web of material in the longitudinal direction, and continuously and simultaneously shaping the plastic web adjacent longitudinal edges with at least three roller set pairs into the closure elements to form a fabricated plastic web, said step of conveying including applying a lateral tension on the plastic web by at least one roller set pair being mounted with a toe-in to exert lateral forces on the edges of the plastic web, sensing the position of one edge of the plastic web and correcting the amount of lateral force being applied to correct for any error in the position of the one edge, bending the plastic web adjacent each longitudinal edge to form a channel along each of the edges of the plastic web, inserting a heated rod-shaped element into each channel, wherein the heated rod-shaped elements will activate an adhesive on the surface of the channels, cooling the adhesive to fix the rod-shaped element in each channel, subsequently heating each channel area to activate the adhesive and wrapping the web at each edge around the rod-shaped element and back into contact with the web adjacent the element to shape each closure element to have a planar side and a undercut profile side and then subsequently cutting the fabricated plastic web to the desired length.

2. A method according to claim 1, wherein the steps of bending and wrapping of the web adjacent the edges is accomplished by a plurality of roller sets adjacent each edge, said roller sets having individual shaped rollers acting with one another to obtain the profiles of the closure element.

3. A method according to claim 1, wherein the steps of heating each channel occur with a hot-air jet, wherein the temperature and flow rate of the hot air are selected so that the adhesive coating is activated but the plastic web is kept below the shrink temperature.

4. A method according to claim 1, which further includes applying an underflap along a longitudinal edge of the plastic web by heating an adhesive coating of the underflap and rolling the underflap onto the plastic web.

5. A method according to claim 1, wherein the bending of the plastic web adjacent each edge is accomplished by the roller sets having a plurality of shaped rollers that supplement one another to obtain the profiles of the closure element.

6. A method according to claim 1, wherein the step of sensing the position of one edge of the plastic web and correcting the amount of lateral force being applied occurs with the assistance of a mechanical lever arrangement having a rocker arm connected to a carriage mounted for rotation around an axis extending perpendicular to the plane of the plastic web.

7. A method according to claim 1, wherein the step of sensing the position of one edge of the plastic web and correcting the amount of lateral force being applied utilizes a servo control unit for rotating a carriage supporting tensioning rollers.

* * * * *